(12) United States Patent
Oda et al.

(10) Patent No.: US 7,960,874 B2
(45) Date of Patent: Jun. 14, 2011

(54) COOLING DEVICE OF LINEAR MOTOR

(75) Inventors: Haruhiro Oda, Tokyo (JP); Toshinori Nakagawa, Tokyo (JP); Tetsuro Ogushi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 12/517,503

(22) PCT Filed: Dec. 21, 2006

(86) PCT No.: PCT/JP2006/325510
§ 371 (c)(1),
(2), (4) Date: Jun. 3, 2009

(87) PCT Pub. No.: WO2008/075435
PCT Pub. Date: Jun. 26, 2008

(65) Prior Publication Data
US 2010/0066179 A1 Mar. 18, 2010

(51) Int. Cl.
H02K 41/02 (2006.01)
H02K 41/00 (2006.01)

(52) U.S. Cl. .............. 310/12.29; 310/12.01; 310/12.11; 310/12.25; 310/12.26; 310/13; 310/14

(58) Field of Classification Search .............. 310/12.11, 310/12.29, 12.31, 13, 14, 12.01, 12.25, 12.26
See application file for complete search history.

(56) References Cited

U.S. PATENT DOCUMENTS
4,642,493 A 2/1987 Wallace

FOREIGN PATENT DOCUMENTS
JP 61-124259 A 6/1986
JP 63-213463 A 9/1988
(Continued)

OTHER PUBLICATIONS
Definition of "slit" from Meriam Webster's Collegiate Dictionary, 10th edition (2001).*

(Continued)

Primary Examiner — Quyen Leung
Assistant Examiner — Jose A Gonzalez Quinones
(74) Attorney, Agent, or Firm — Buchanan Ingersoll & Rooney PC

(57) ABSTRACT

A cooling device of a linear motor to cool a primary side of the linear motor including an iron core and a coil accommodated in slots of the iron core, including an elongate cover covering coil end portions exposed from both side faces of the iron core in a longitudinal direction, an air channel serving as blower for forcing a current of cooling air inside the cover, and a partition plate dividing the inside of the cover into upper and lower spaces. It is configured in such a manner that the upper space divided by the partition plate is used as a ventilation portion through which a current of cooling air is forced and the lower space is used as a cooling portion in which the coil end portions are accommodated and cooled. A slit is formed almost along a full length of the partition plate on a side closer to the iron core for bringing the ventilation portion and the cooling portion into communication with each other, and a vent is provided in a lower portion of the cooling portion.

4 Claims, 3 Drawing Sheets

FOREIGN PATENT DOCUMENTS

| | | | |
|---|---|---|---|
| JP | 63-283460 | A | 11/1988 |
| JP | 64-034105 | A | 2/1989 |
| JP | 01034105 | A * | 2/1989 |
| JP | 2-184204 | A | 7/1990 |
| JP | 8-280166 | A | 10/1996 |
| JP | 8-280167 | A | 10/1996 |
| JP | 10-285902 | A | 10/1998 |
| JP | 2001-275334 | A | 10/2001 |
| JP | 2004-112955 | A | 4/2004 |

OTHER PUBLICATIONS

Form PCT/ISA/210 (International Search Report) dated Feb. 6, 2007.

* cited by examiner

COOLING DEVICE OF LINEAR MOTOR

TECHNICAL FIELD

The present invention relates to a cooling device of a linear motor that forcedly cools a linear motor driving a vehicle with a blower.

BACKGROUND ART

As a cooling device of a linear motor for driving a vehicle, there is a cooling device configured, for example, in such a manner that the coil of the linear motor is covered with a duct and the coil is cooled by letting a current of cooling air through the duct. According to this cooling device, the duct is divided into two parts along the longitudinal direction and one is used as a cooling portion in which the coil is accommodated and cooled and the other is used as a ventilation portion through which a current of cooling air from the blower is forced. A plurality of continuous holes are provided between the cooling portion and the ventilation portion along the longitudinal direction of the duct (see Patent Document 1).

Because the linear motor main body is of an elongate structure as a whole, so is the duct that covers the coil. Accordingly, it is configured in such a manner that the hole diameter of the continuous holes is made larger with an increasing distance from right beside the blower for forcing a current of cooling air inside the ventilation portion into the cooling portion at an almost uniform pressure along the longitudinal direction of the duct, so that the entire coil is cooled homogeneously.

Patent Document 1: JP-A-64-34105 (page 1 and FIG. 1 through FIG. 3)

DISCLOSURE OF THE INVENTION

Problems that the Invention is to Solve

In the cooling device of the linear motor described in Patent Document 1 supra, because the cooling portion and the ventilation portion are brought into communication with each other via a plurality of continuous holes, a pressure loss is generated when a current of cooling air passes through the continuous holes, which deteriorates the cooling efficiency. Also, dust or the like sucked in through the blower may possibly clog the continuous holes. In a case where the continuous holes are clogged, a current of cooling air is not supplied to apart of the coil near the clogged continuous holes. This possibly leads to an event where heat generation increases locally to the extent that the temperature exceeds the allowable temperature. This cooling device therefore has a problem that cleaning maintenance to remove dust accumulated in the continuous holes has to be performed frequently in order to avoid such an event.

The invention was devised to solve the problem discussed above and has an object to provide a cooling device of a linear motor capable of cooling a coil portion almost homogeneously and efficiently and facilitating cleaning maintenance by making it harder for dust-induced clogging to occur.

Means for Solving the Problem

A cooling device of a linear motor of the invention is a cooling device of a linear motor incorporated in a vehicle running on rail tracks at a lower portion so as to oppose a secondary side of a linear motor laid on the rail tracks and configured to cool a primary side of the linear motor having an iron core that is long in a running direction and a coil accommodated in a slot of the iron core. It includes: an elongate cover that covers end portions of the coil exposed from both side faces of the iron core in a longitudinal direction; blower means for forcing a current of cooling air inside the cover; and a partition plate that divides an inside of the cover into an upper space and a lower space. The upper space divided by the partition plate is used as a ventilation portion through which the current of cooling air is forced and the lower space is used as a cooling portion in which the end portions of the coil are accommodate and cooled. A slit is formed almost along a full length of the partition plate on a side closer to the iron core for bringing the ventilation portion and the cooling portion into communication with each other. A vent is provided in a lower portion of the cooling portion.

Advantage of the Invention

According to the cooling device of the linear motor of the invention, the inside of the cover covering the end portions of the coil is divided into upper and lower spaces using the partition plate. The upper space is used as the ventilation portion and the lower space is used as the cooling portion in which the end portions of the coil are accommodated and cooled. The ventilation portion and the cooling portion are brought into communication with each other via the slit formed along the partition plate on the side closer to the iron core and the vent is provided in the lower portion of the cooling portion. Owing to this configuration, a current of cooling air from the blower means is sent to the cooling portion at almost uniform pressure and temperature across the entire region in the longitudinal direction of the cover by passing through the slit from the ventilation portion. It thus becomes possible to cool the end portions of the coil almost homogeneously.

In addition, because the communication portion is formed of the slit, clogging by dust hardly occurs, which facilitates the maintenance, such as cleaning.

BEST MODE FOR CARRYING OUT THE INVENTION

First Embodiment

Figure 1:
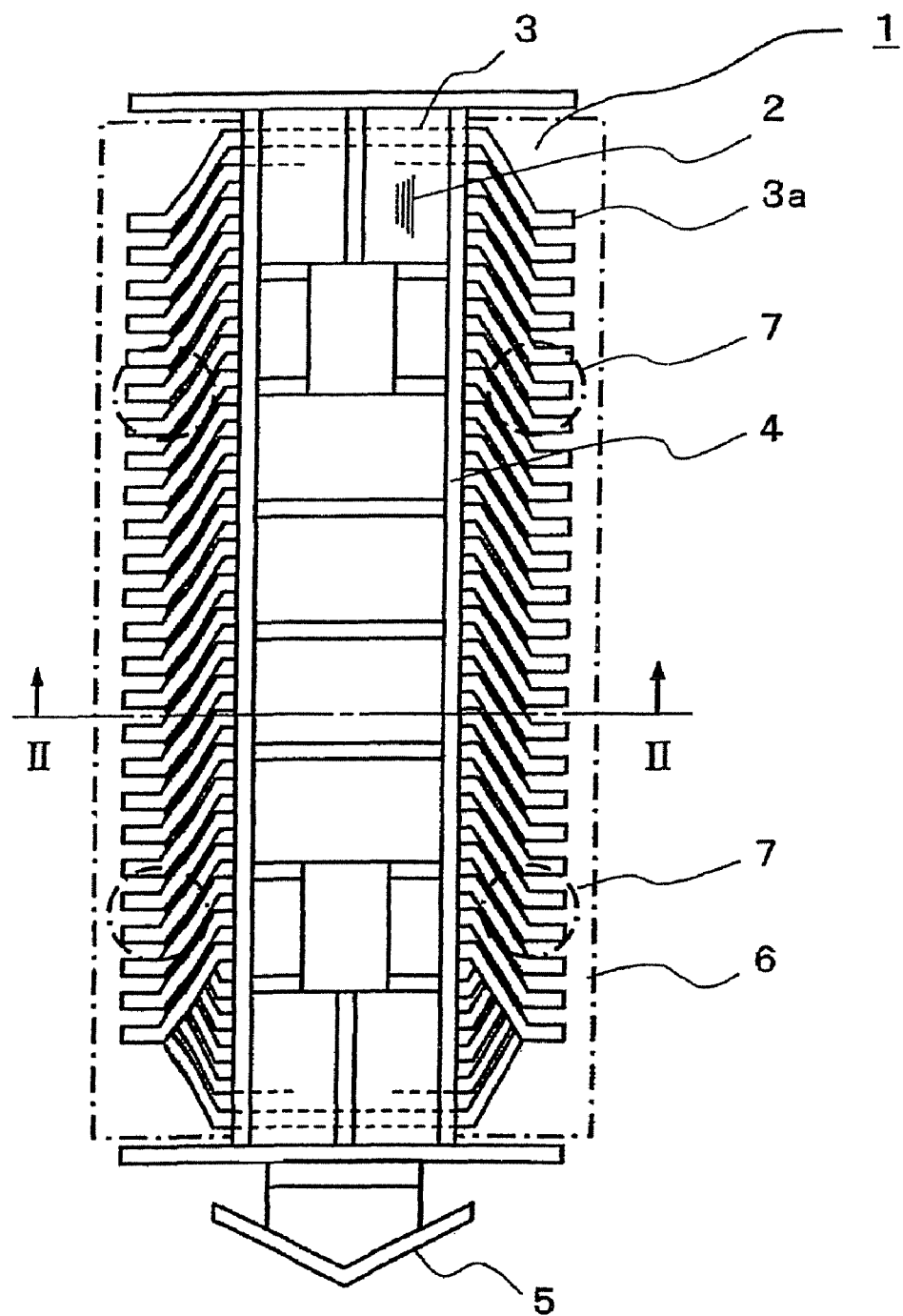
FIG. 1 is a plan view showing a cooling device of a linear motor according to a first embodiment of the invention.
Figure 2:
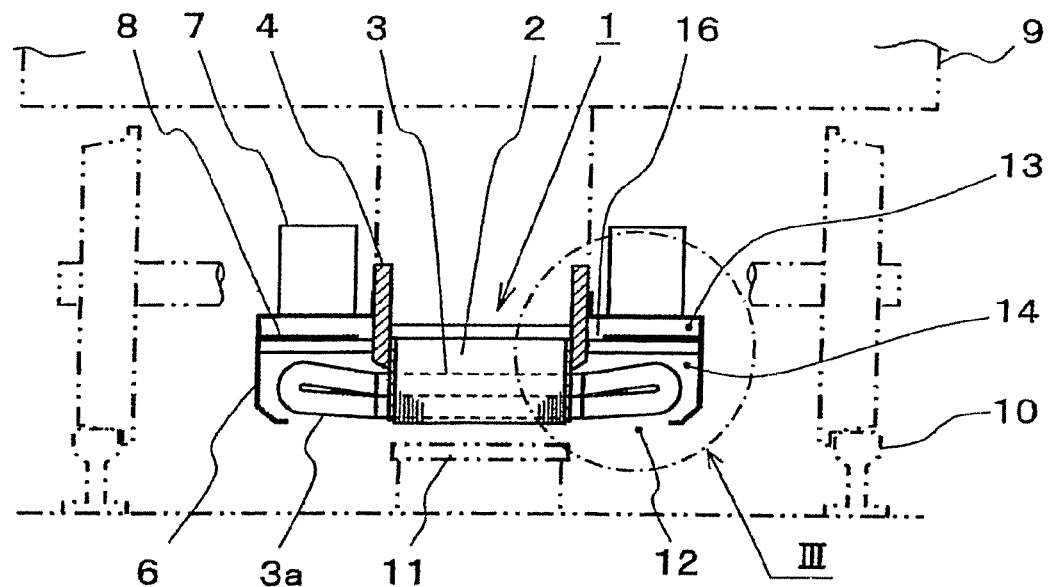
FIG. 2 is a sectional side view taken on line II-II of FIG. 1.
Figure 3:
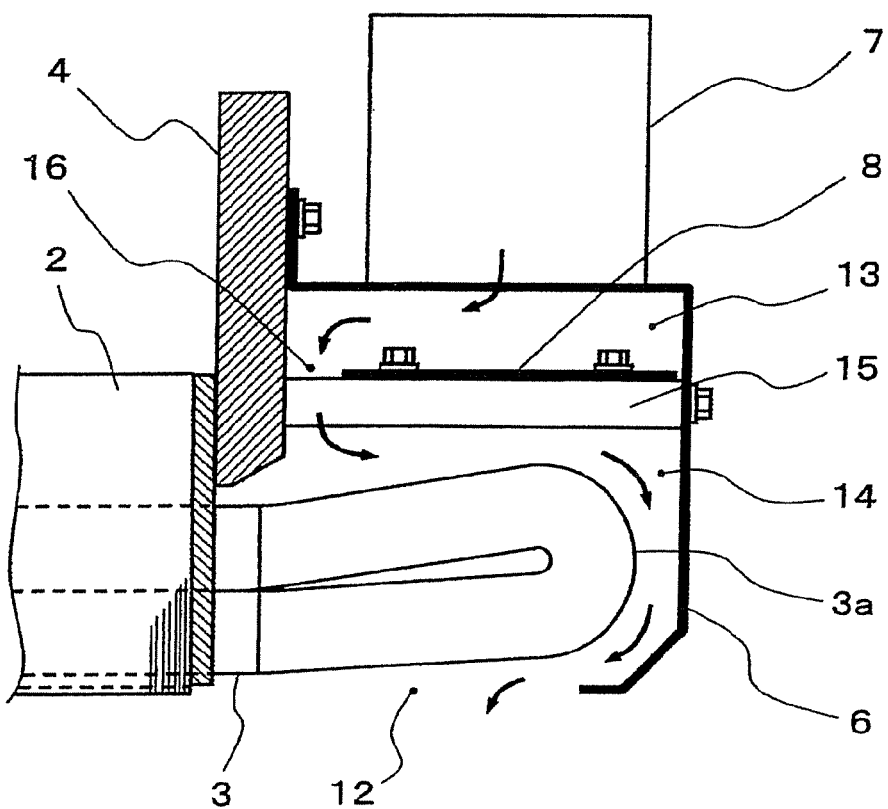
FIG. 3 is an enlarged cross section of a part III of FIG. 2.

FIG. 1 is a plan view of a linear motor main body provided with a cooling device according to a first embodiment of the invention. FIG. 2 is a cross section taken on line II-II of FIG. 1. In FIG. 1, a part of components are indicated by a dashed line to make the coil inside visible. FIG. 3 is an enlarged cross section of a portion III of FIG. 2.

Referring to FIG. 1 through FIG. 3, a linear motor main body 1, which is the primary side of the linear motor, is formed by including an iron core 2 formed almost in the shape of a square prism by layering a large number of elongate silicon steel sheets, a coil 3 accommodated in a plurality of slots (not shown) formed in a direction orthogonal to the longitudinal direction of the iron core, a frame 4 holding the iron core 2 by pinching and fastening it from the both sides in the longitudinal direction, and a fender 5 provided at the top of the frame 4 to protect the coil 3 from obstacles.

Coil end portions 3a on the both sides of the coil 3 are exposed to the outside from the both side faces of the iron core 2 in the longitudinal direction. As is shown in the enlarged view of FIG. 3, each is formed by being bent at the extreme tip.

A cooling device to cool the iron core 2 and the coil 3 includes an elongate cover 6 provided on the both sides of the iron core 2 along the longitudinal direction so as to cover the exposed coil end portions 3a, blower means having a blower (not shown) for forcedly supplying a current of cooling air inside the cover 6, and a partition plate 8 that divides the inside of the cover 6 into upper and lower spaces. The drawing only shows a portion of an air channel 7, which is an introduction portion of a current of cooling air into the cover 6 and forms a part of the blower means. One or more than one air channel 7 is provided on the top face of the cover 6 in the longitudinal direction. FIG. 1 shows a case where two air channels 7 are provided on each side of the cover 6. The number of the air channels 7, however, can be determined according to the length of the cover 6. Also, the blower may be provided directly to each air channel 7 or it may be provided to a different site with piping installation so that air is sent to the respective air channels 7 via the blower tubes.

As is shown in FIG. 2, the linear motor main body 1 and the cooling device thereof configured as above are installed under the floor of a vehicle 9 of an electric rolling stock with the coil 3 side down while aligning the longitudinal direction of the iron core 2 with a running direction.

Meanwhile, at the center between rails 10 of rail tracks laid on the ground, a reaction plate 11, which is the secondary side of the linear motor, is laid along the full length of the rail tracks. The reaction plate 11 and the iron core 2 oppose each other while keeping a predetermined clearance in between.

The vehicle 9 runs using an electromagnetic interaction of the linear motor main body 1 that is the primary side of the linear motor and the reaction plate 11 that is the secondary side as a propulsion source.

The cooling device of the linear motor, which is the principal part of the invention, will now be described more in detail with reference to the enlarged cross section of FIG. 3.

The cover 6 is molded by bending a thin plate so as to enclose the coil end portions 3a. It is fixed to the frame 4 in a reattachable manner at one end by means of bolting or the like while it is opened with a wide clearance from the side face of the iron core 2 at the other end. This opening is used as a vent 12 of a current of cooling air. The internal space is divided into upper and lower spaces by the plate 8 that is elongate in the longitudinal direction of the cover 6. Of the two divided spaces, the upper space is used as a ventilation portion 13 through which a current of cooling air is forced and the lower space is used as a cooling portion 14 in which the coil end portions 3a are accommodated and cooled.

In order to prevent the coil end portions 3a facing the vent 12 from being damaged by an obstacle bouncing up from the ground, a measure is taken, for example, by providing a protection cover. Such a measure, however, is not the principal part of the invention and an illustration thereof is omitted herein.

The partition plate 8 is attached to a plurality of supporting members 15 provided integrally with the frame 4 in a reattachable manner by means of bolting or the like.

A slit 16 that brings the ventilation portion 13 and the cooling portion 14 into communication with each other is formed along almost the full length of the partition plate 8 on the side closer to the iron core 2 in a direction parallel to the longitudinal direction of the iron core 2. As a concrete forming method of the slit 16, as is shown in FIG. 3, the width dimension of the partition plate 8 is set smaller than the width dimension of the ventilation portion 13 and the partition plate 8 is attached to the supporting members 15 while leaving a clearance on the frame 4 side. The clearance thus formed is used as the slit 16. Alternatively, the slit may be formed directly in the longitudinal direction of the partition plate 8 on the side closer to the iron core 2.

A function of the cooling device of the linear motor configured as above will now be described.

A current of cooling air from the blower (not shown) is introduced into the ventilation portion 13 inside the cover 6 via the air channels 7. Subsequently, a current of cooling air is distributed in the ventilation portion 13 across the entire region in the longitudinal direction of the linear motor main body 1. A current of cooling air then flows into the cooling portion 14 by passing through the slit 16 so as to cool the coil end portions 3a inside the cooling portion 14, after which it is discharged to the outside through the vent 12 provided in the bottom face of the cover 6.

Because the ventilation portion 13 and the cooling portion 14 are brought into communication with each other through the slit 16 that is long in the longitudinal direction, a pressure loss is so small that a current of cooling air inside the ventilation portion 13 flows into the cooling portion 14 while maintaining almost uniform temperature and pressure across the entire region in the longitudinal direction of the cover 6. It is therefore possible to cool the coil end portions 3a almost homogeneously across the entire region. Also, as is shown in FIG. 3, a current of cooling air inside the cooling portion 14 coming therein from the side of the coil end portions 3a closer to the iron core 2 flows along the outer peripheral surface of the coil end portions 3a and is discharged through the vent 12 in the bottom face. It is therefore possible to cool the entire coil end portions 3a efficiently.

In a case where a plurality of air channels 7 are provided to the cover 6 in the longitudinal direction, a current of cooling air having a small pressure difference along the longitudinal direction of the cover 6 can be introduced inside, which makes it possible to enhance the advantage described above.

Further, because the cover 6 and the partition plate 8 are attached, respectively, to the frame 4 and the supporting members 15 in a reattachable manner, even when dust accumulates inside the cover 6, the cooling device can be disassembled easily.

As has been described, according to this embodiment of the invention, the cooling device includes the elongate cover that covers the end portions of the coil exposed from the both side faces of the iron core in the longitudinal direction, the blower means for forcing a current of cooling air inside the cover, and the partition plate that divides the inside of the cover into upper and lower spaces. The upper ventilation portion and the lower cooling portion accommodating the coil end portions therein are divided by the partition plate while they are brought into communications with each other via the slit formed almost along the full length of the partition plate on the side closer to the iron core, and the vent is provided in the lower portion of the cooling portion. A current of cooling air from the blower means is therefore sent to the cooling portion almost at uniform pressure and temperature across the entire region in the longitudinal direction of the cover by passing through the slit from the ventilation portion. It thus becomes possible to cool the end portions of the coil almost homogeneously and efficiently.

In addition, even in a case where dust is contained in a current of cooling air, because the communication portion is formed of a slit, clogging by dust hardly occurs. This eliminates a concern about extraordinary heat generation caused by clogging. The maintenance, such as cleaning, can be therefore facilitated.

Also, a plurality of introduction portions that force a current of cooling air from the blower means into the cover are provided on the top face of the cover in the longitudinal direction. It thus becomes possible to introduce a current of cooling air having a small pressure difference along the longitudinal direction of the cover inside the ventilation portion.

Second Embodiment

Figure 4:
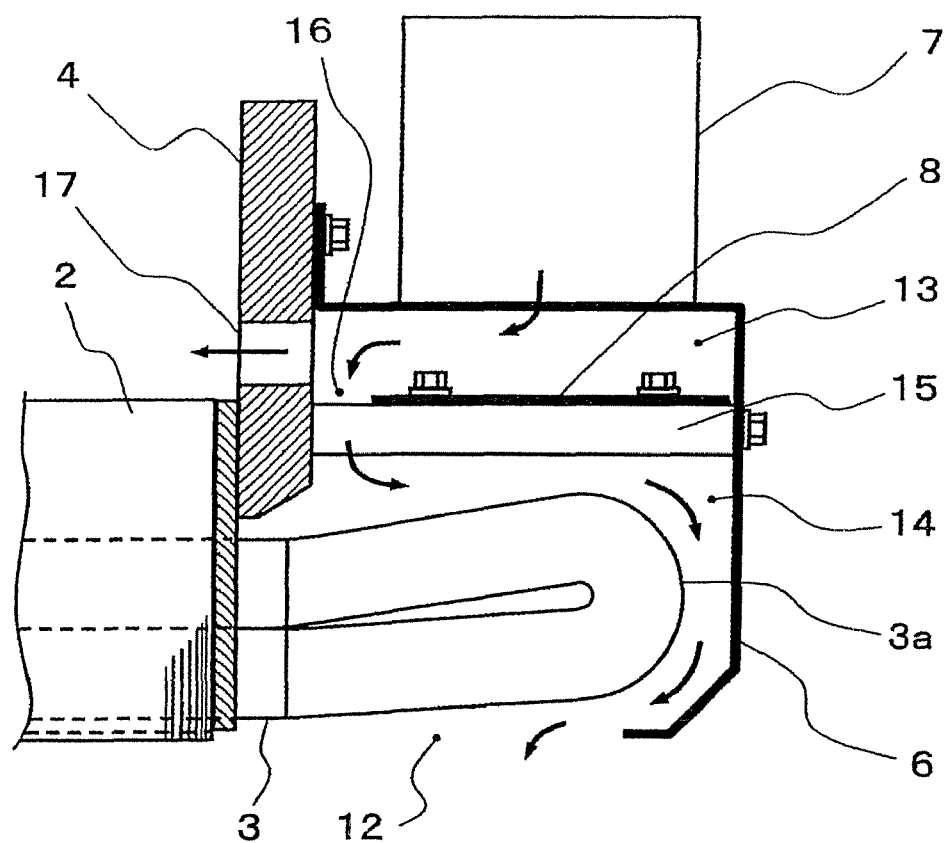
FIG. 4 is a sectional side view showing a major portion of a cooling device of a linear motor according to a second embodiment of the invention.

FIG. 4 is an enlarged cross section showing a major portion of a cooling device of a linear motor according to a second embodiment, and it shows a portion corresponding to the portion shown in FIG. 3 of the first embodiment above. Because the configuration of the overall linear motor is the same as the configuration shown in FIG. 1 and FIG. 2 of the first embodiment above, the illustration and the description therefore are omitted herein. Also, portions same as those in FIG. 3 are labeled with the same reference numerals to omit the description thereof and a difference will be chiefly described in the following.

As is shown in FIG. 4, a difference is that a plurality of ventilation holes 17 that bring the ventilation portion 13 inside the cover 6 and the top face of the iron core 2 into communication with each other are formed in the frame 4, so that part of a current of cooling air from the blower means is distributed and sent onto the top face of the iron core 2. The configuration is the same as the one shown in FIG. 3 except that the ventilation holes 17 are provided.

A function of the cooling device of the linear motor configured as above will now be described.

A current of cooling air from the blower (not shown) is introduced inside the ventilation portion 13 via the air channels 7 and most of it flows into the cooling portion 14 by passing through the slit 16 and cools the coil end portions 3a. Meanwhile, part of it is distributed through the ventilation holes 17 and flows onto the top face of the iron core 2 to cool the iron core 2. As has been described, this embodiment has a structure capable of cooling the coil end portions 3a and the top face of the iron core 2 simultaneously.

As has been described, according to this embodiment of the invention, a plurality of ventilation holes communicating from the ventilation portion inside the cover to the top face of the iron core are provided, so that part of a current of cooling air from the blower means is sent onto the top face of the iron core. Hence, in addition to the advantage of the first embodiment above, this configuration makes it possible to cool the iron core simultaneously. The cooling efficiency of the overall linear motor main body can be thus enhanced.

The invention claimed is:

1. A cooling device of a linear motor for a vehicle incorporated in a vehicle running on rail tracks at a lower portion so as to oppose a secondary side of a linear motor laid on the rail tracks and configured to cool a primary side of the linear motor having an iron core that is long in a running direction and a coil accommodated in a slot of the iron core, comprising:

an elongate cover that covers end portions of the coil exposed from both side faces of the iron core in a longitudinal direction;
blower means for forcing a current of cooling air inside the cover; and
a partition plate that divides an inside of the cover into an upper space and a lower space, wherein:
the upper space divided by the partition plate is used as a ventilation portion through which the current of cooling air is forced and the lower space is used as a cooling portion in which the end portions of the coil are accommodated and cooled;
a slit is formed almost along a full length of the partition plate on a side closer to the iron core in a direction parallel to the longitudinal direction of the iron core for bringing the ventilation portion and the cooling portion into communication with each other; and
a vent is provided in a lower portion of the cooling portion by making an open space formed from the iron core.

2. The cooling device of a linear motor for a vehicle according to claim 1, wherein:
a plurality of introduction portions that force the current of cooling air from the blower means inside the cover are provided on a top face of the cover in a longitudinal direction.

3. The cooling device of a linear motor for a vehicle according to claim 1, wherein:
a plurality of ventilation holes communicating from the ventilation portion inside the cover to a top face of the iron core are provided so as to send part of the current of cooling air from the blower means onto the top face of the iron core.

4. The cooling device of a linear motor for a vehicle according to claim 2, wherein:
a plurality of ventilation holes communicating from the ventilation portion inside the cover to a top face of the iron core are provided so as to send a part of the current of cooling air from the blower means onto the top face of the iron core.

* * * * *